United States Patent [19]

Iodvalkis et al.

[11] 4,041,504
[45] Aug. 9, 1977

[54] PHOTOGRAPHIC EXPOSURE SETTING DEVICE

[76] Inventors: Vitautas Jurgio Iodvalkis, ulitsa Dzerzhinskogo, 9, Kv. 13; Richardas Prano Nomitsas, ulitsa Kestuche, 5, Kv. 2, both of Vilnjus; Anatoly Fedorovich Andreev, ulitsa Karpinskogo, 10, Kv. 35; Vladimir Borisovich Grekov, Sinyavinskaya ulitsa, 16, Kv. 10, both of Leningrad, all of U.S.S.R.

[21] Appl. No.: 579,071

[22] Filed: May 19, 1975

[51] Int. Cl.² ............................................. G03B 7/08
[52] U.S. Cl. ............................ 354/23 R; 354/51; 354/53; 354/60 L
[58] Field of Search .......... 354/60 L, 60 R, 50, 354/51, 53, 23, 23 D

[56] References Cited

U.S. PATENT DOCUMENTS

| | | | |
|---|---|---|---|
| 3,782,254 | 1/1974 | Matsuzaki et al. | 354/51 |
| 3,792,648 | 2/1974 | Ishiguro | 354/23 D |
| 3,978,499 | 8/1976 | Nagaoka et al. | 354/53 X |

*Primary Examiner*—L. T. Hix
*Assistant Examiner*—J. A. LaBarre

[57] ABSTRACT

Photographic exposure setting device comprising an exposure time setting unit and two units for indicating insufficient and excessive illumination intensity which determine the degree of illumination of an object being photographed, these units being constructed in the form of three threshold amplifiers interconnected by means of transistor switches, each amplifier having at its input integrating timing RC circuits. The first integrating timing RC circuit has a variable time constant value which depends upon the intensity of light received by its photoresistor from the object being photographed. The remaining RC circuits have fixed time constant values and are correspondingly adjusted for a minimum and maximum time of exposure in non-automatic photography. A comparison between the variable time constant value and the fixed time constant values makes it possible to accurately determine favorable conditions for photography and indicate them with the aid of signal lamps.

3 Claims, 2 Drawing Figures

\* INSUFFICIENT ILLUMINATION INDICATING UNIT
⊖ EXCESSIVE ILLUMINATION INDICATING UNIT
▢ VOLTAGE STABILIZER

PHOTOGRAPHIC EXPOSURE SETTING DEVICE

BACKGROUND OF THE INVENTION

The present invention relates to photographic equipment and, more particularly, to exposure setting devices for adjusting exposure depending upon the intensity of illumination of an object being photographed and the sensitivity of the film used.

The proposed exposure setting device is intended for setting a required time of exposure, warning about unfavorable conditions for photography and adjusting the power source voltage to ensure fixed exposure time values.

The invention is utilised for automatic exposure time or diaphragm setting and as an electronic release device for all types of photographic equipment. In addition, the device of the present invention may be used as a threshold element in timers, etc.

Most conventional exposure setting devices intended for automatic exposure and diaphragm setting comprise, as a main unit, an integrating timing RC circuit with variable parameters, wherein the variable parameter is a light-sensitive element, for example, a photoresistor, of a threshold unit, an actuator and a signal unit. The light flux reflected from an object being photographed is incident on the light-sensitive element and alters its parameters. A change in these parameters brings about a change in the time constant of the integrating RC circuit. Depending upon the latter's value, the threshold unit sets the exposure time or diaphragm and correspondingly control the actuator. The signal unit is intended for indicating the observation conditions.

The known exposure setting devices are intended, in the main, only for a specific type of equipment. The electrical circuitry of such devices incorporates in most cases p-n-p and n-p-n semiconductor elements; high input resistancies are ensured through the use of field-effect transistors or metal-oxide-semiconductor structures, which accounts for an extremely complicated process of producing a circuit in a single crystal.

In order to simplify the electric circuit of an exposure setting device, many companies make use of a great number of mechanical contacts, which reduces the reliability of the photographic equipment as a whole. In many types of cameras accurate indication of conditions for photography is ensured with the aid of pointer indicators.

In addition, conventional devices lack means for stabilizing the exposure time duration depending upon variations in the supply voltage.

The foregoing considerations dictate the necessity of evolving an all-purpose electronic microcircuit for exposure setting which is applicable in all types of photographic equipment.

SUMMARY OF THE INVENTION

It is an object of the present invention to provide an exposure setting device built around a single crystal and incorporating transistors of the same type of conductivity.

It is another object of the present invention to ensure a low threshold voltage level in the foregoing device.

It is still another object of the present invention to stabilize exposure time and provide a simple signal circuit for indicating the illumination of an object being photographed.

The foregoing and other objects of the invention are attained by providing an exposure setting device comprising an exposure time setting unit constructed in the form of a threshold amplifier; a first integrating timing RC circuit, the illumination of the photoresistance of that circuit determining the time constant thereof; a voltage divider adjusting the operation threshold of the threshold amplifier depending upon the sensitivity of the photographic material used, and an actuator connected to the shutter of the camera.

In accordance with the invention, the device further comprises a unit for indicating excessive illumination and a unit for indicating insufficient illumination, each of these units being constructed as a threshold current amplifier. Connected to one input of each unit is an intergrating timing RC circuit, the other input being connected via a respective transistor switch to another output of the exposure time setting unit. The input of each switch is connected to the output of the same threshold current amplifier whose second output is connected to an indicator lamp.

The proposed exposure setting device may also include an exposure time stabilizer constructed as a flip-flop and connected to the input of the exposure time setting unit via the capacitor of the first integrating timing RC circuit.

This provides for automatic adjustment of exposure time and thus for optimum exposure depending upon the illumination of an object being photographed and the sensitivity of the film.

BRIEF DESCRIPTION OF THE ATTACHED DRAWINGS

FIG. 1 is a functional block diagram of an exposure setting device in accordance with the invention; and FIG. 2 is a diagram of an exposure setting device in accordance with the invention.

DESCRIPTION OF THE PREFERRED EMBODIMENTS

Figure 1:
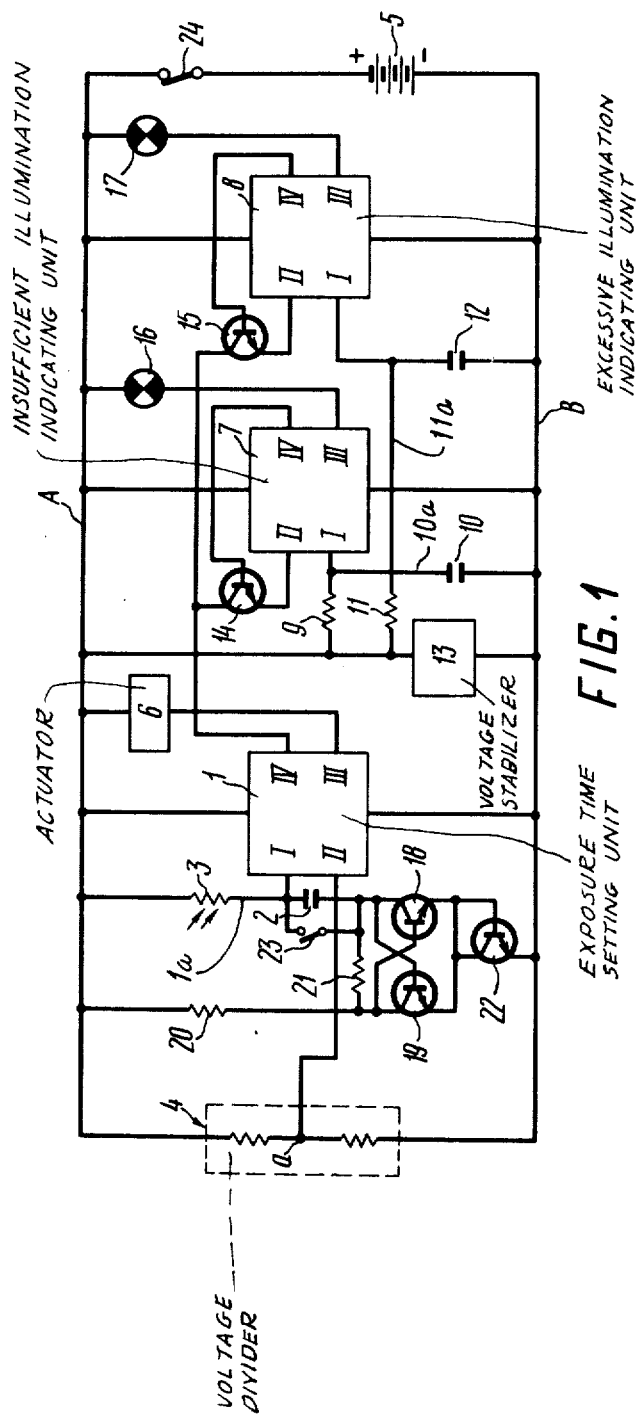

The proposed exposure setting device comprises an exposure time setting unit 1 (FIG. 1) constructed in the form of a threshold amplifier built around transistors. The unit 1 has two inputs I and II and two outputs III and IV. Connected to the input I of the exposure time setting unit 1, through a line 1a, an integrating timing RC circuit comprising a capacitor 2 and a photoresistor 3 with a variable time constant value. $\tau_1$. The time constant value $\tau_1$ depends upon the resistance of the photoresistor 3 which changes in proportion to its illumination. The latter corresponds to the illumination of an object being photographed.

Connected to the input II of the exposure time setting unit 1 is the center tap $a$ of a voltage divider 4 which sets depending upon the resistance ratio of resistors incorporated therein, the operation threshold of the exposure time setting unit 1 in correspondence with the sensitivity of the photographic material selected for photography.

In the embodiment under review the voltage divider 4 is built around two resistors; if films of different sensitivity are used, the divider may be multistage. The exposure setting device is energized from a power source 5 have two buses, a positive bus A and a negative bus B. Connected to these buses are leads of a first RC circuit and the voltage divider 4. Electrically interposed between the positive bus A of the power source 5 and the output III of the exposure time setting unit 1 is an actuator 6 constructed as an electromagnet. The actuator is further connected to a shutter of a camera (not shown).

The exposure setting device of the present invention further includes an insufficient illumination indicating unit 7 and an excessive illumination indicationg unit 8. Both units 7 and 8 are also constructed as threshold current amplifiers, each having two inputs I and II and two outputs III and IV.

Each of the threshold current amplifiers comprises serially connected transistors (not shown in FIG. 1) operating in the switching mode as current amplifiers. Connected to the inputs I of the units 7 and 8 is a respective (second or third) integrating timing RC circuit having a predetermined time constant value $\tau_2$ or $\tau_3$, respectively.

Connected to the input I of the unit 7 is a second integrating timing RC circuit comprising a resistor 9 and a capacitor 10, linked by a wire 10a, the circuit being designed for a maximum permissible exposure in non-automatic photography.

Connected to the input I of the unit 8 is a third integrating timing RC circuit comprising a resistor 11 and a capacitor 12, interlinked by a wire 11a, this circuit being in turn designed for a minimum exposure which the mechanical components of the shutter can provide. Both integrating timing RC circuits are energized from a voltage stabilizer 13.

Connected to the inputs II of the unit 7 and 8 are a first and a second transistor switches 14 and 15, respectively. The collectors of the switches are connected to the output IV of the exposure time setting unit 1, their bases being connected to the output IV of the respective units 7 and 8.

There are signal lamps 16, 17 having one of their leads connected to the output III of units 7 and 8, while the other leads of these lamps are connected to the positive supply bus A of the power supply unit 5.

The proposed exposure setting unit further includes an exposure time stabilizer constructed as a conventional flip-flop built around transistors 18 and 19 and connected to the input I of the exposure time setting unit 1 via the capacitor 2 of the first integrating timing RC circuit. A junction point between resistors 20, 21 is connected to the collector of the transistor 19, the collector being coupled via the resistor 20 to the positive bus A of the power source 5. The collectors of the transistors 18 and 19 are bridged by the resistor 21. The emitters of the transistors are interconnected and coupled via a transistor 22, operating as a diode, to the negative bus B of the power source 5.

Electrically interposed between the input I of the unit 1 and the collector of the transistor 18 is a switch 23 for discharging the capacitor 2. The posititive bus A is coupled to the power source 5 via a switch 24.

Figure 2:
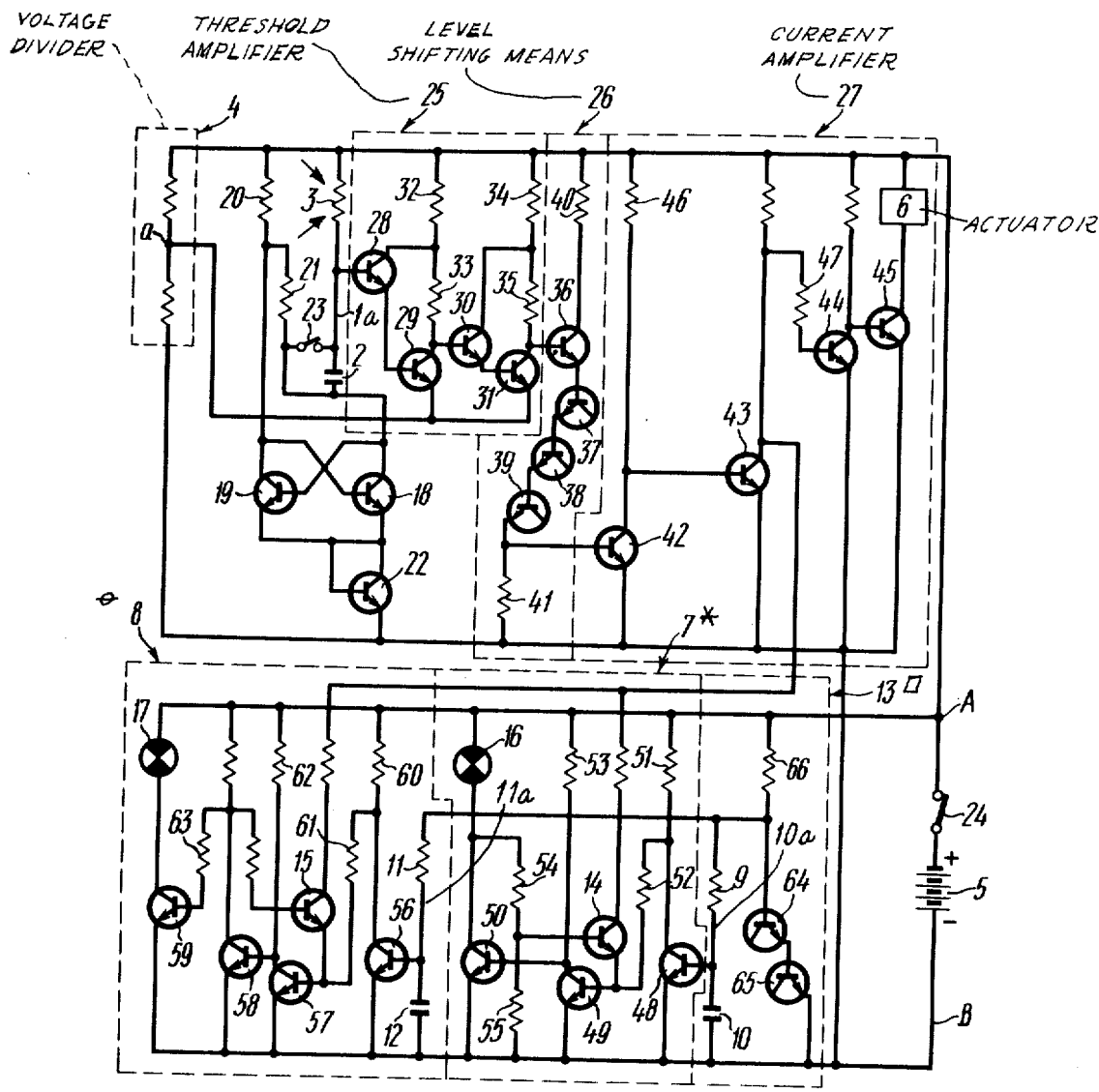

The exposure time setting unit 1 includes a threshold amplifier 25 (FIG. 2), a shifting means 26 and a current amplifier 27.

The threshold amplifier 25 comprises transistors 28, 29, 30 and 31. The first input I of the exposure time setting unit 1 (at wire 1a) is the base of the transistor 28 whose collector is connected to the center tap of load resistors 32 and 33 of the transistor 29, the emitter of the transistor 28 being connected to the base of the transistor 29. The collector of the transistor 29 is connected to the base of the transistor 30. The collector of the transistor 30 is connected to the center tap of load resistors 34 and 35 of the transistor 31, the emitter of the transistor 30 being connected to the base of the transistor 31. The emitters of the transistors 29 sand 31 are interconnected and are linked to the second input II of the exposure time setting unit 1, which input II is connected to the center tap a of the voltage divider 4.

The voltage level shifting unit 26 comprises transistors 36, 37, 38 and 39. The base of the transistor 36 is connected to the collector of the transistor 31. The collector of the transistor 36 is coupled via a current limiting resistor 40 to the positive bus A of the power source 5. The emitter of the transistor 36 is connected to the base of the transistor 37, whereas the emitter of the transistor 37 is connected to the base of the transistor 38. Thus, only the base-emitter junction is employed in the transistor 37.

The transistors 38 and 39 are connected in a similar manner. The emitter of the transistor 39 is coupled via a resistor 41 to the negative bus B of the power source 5.

The current amplifier 27 is built around transistors 42, 43, 44 and 45. The input of this amplifier is the base of the transistor 42 connected to the emitter of the transistor 39. The emitter of the transistor 42 is connected to the negative bus B of the power source 5. The collector of the transistor 42 is coupled via a load resistor 46 to the positive bus A of the power source 5 and to the base of the transistor 43. The emitter of the transistor 43 is connected to the negative bus B of the power source 5.

The foregoing connection of the transistors 42, 43, 44 and 45 is referred to as common-emitter connection.

The collector of the transistor 43 is the output IV of the exposure time setting unit 1. In addition, to the collector of the transistor 43 there is connected, via a current limiting resistor 47, the base of the transistor 44 which also operates in the switching mode. Connected to the collector of the transistor 44 is the base of the transistor 45, the emitters of the transistors 44 and 45 being connected to the negative bus B of the power source 5, the collector of the transistor 45 being the output III of the exposure time setting unit 1 whose load is the actuator 6.

The unit 7 for indicating insufficient illumination of an object being photographed comprises transistors 48, 49 and 50. The base of the transistor 48 (at line 10a) is the input I of the insufficient illumination indicating unit 7. The emitter of the transistor 48 is connected to the negative bus B of the power source 5, the collector of the transistor 48 being coupled via a load resistor 51 to the positive bus A of the power source 5. In addition, the collector of the transistor 48 is coupled via an isolation resistor 52 to the base of the transistor 49.

The base of the transistor 49 is at the same time the input II of the insufficient illumination indicating unit 7. The emitter of the transistor 49 is connected to the negative bus B of the power source 5. The collector of the transistor 49 is coupled via a load resistor 53 to the positive bus A of the power source 5. Besides, the collector of the transistor 49 is connected to the base of the transistor 50. The emitter of the transistor 50 is connected to the negative bus B of the power source 5.

The foregoing connection of the transistors 48, 49 and 50 is also referred to as common-emitter connection. The collector of the transistor 50 is the output III of the insufficient illumination indicating unit 7. Besides, connected to the collector of the transistor 50 is one terminal of a resistor voltage divider comprising resistors 54 and 55. The center tap of the voltage divider is the output IV of the insufficient illumination indicating unit 7, the other terminal of the divider being connected to the negative bus B of the power source 5.

The excessive illumination indicating unit 8 is built around transistors 56, 57, 58 and 59. The base of the transistor 56 is the input I of the excessive illumination indicating unit 8. The emitter of the transistor 56 is connected to the negative bus B of the power source 5. The collector of the transistor 56 is coupled via a load resistor 60 to the positive bus A of the power source 5, and via a current limiting resistor 61 to the base of the transistor 57, which is also the input II of the excessive illumination indicating unit 8. The emitter of the transistor 57 is connected to the negative bus B of the power source 5, whereas its collector is coupled via a load resistor 62 to the positive bus A of the power source 5 and to the base of the transistor 58.

The emitter and collector of the transistor 58 are connected in a similar manner to the buses A and B of the power source 5. Connected to the collector of the transistor 58 via a current limiting resistor 63 is the base of the transistor 59. The emitter of the transistor 59 is connected to the negative bus B of the power source 5.

The foregoing connection of the transistors 56, 57, 58 and 59 is also referred to as common-emitter connection. The collector of the transistor 59 is the output IV of the excessive illumination indicating unit 8.

The voltage stabilizer 13 comprises transistor 64 and 65 and a ballast resistor 66, the base of the transistor 64 being connected to one lead of the ballast resistor 66. The emitter of the transistor 64 is connected to the base of the transistor 65 whose emitter is connected to the negative bus B of the power source 5. The other lead of the ballast resistor 66 is connected to the positive bus A of the power source 5.

The proposed exposure setting device operates as follows.

As the release button (not shown), which has two positions for measuring and picture taking, respectively, is pressed, voltage is supplied from the power source 5, prior to exposure, to the electric circuit of the exposure setting device. As this takes place, the three timing capacitors start being charged. There are: the capacitor 2 with the variable time constant $\tau_1$, which is charged via the photoresistor 3; the capacitor 10 with the time constant $\tau_2$, which is charged via the resistor 9; and the capacitor 12 with the time constant $\tau_3$, which is charged via the resistor 11. The time constant $\tau_2$ is a fixed value designed for a maximum exposure; the time constant $\tau_3$ is also a fixed value designed for a minimum exposure. The time constant $\tau_1$ is a variable value and depends upon the resistance of the photoresistor 3 which, in turn, is determined by the intensity of illumination of an object being photographed.

The principle of measuring the illumination intensity of the object being photographed is based upon comparing the value of the fixed time constant $\tau_1$ with the values of the time constants $\tau_2$ and $\tau_3$. If the illumination of the object being photographed is normal, the capacitor 12 is the first to be charged to reach the threshold voltage of the excessive illumination indicating unit 8; the transistor 56 is then rendered conducting. That transistor renders the transistor 57 non-conducting, which latter, in turn, drives the transistor 58 into conduction and renders the transistor 59 non-conducting.

A high potential is formed at the collector of the transistor 59, so there is no current across the indicator lamp 17. The transistors 56, 57, 58 and 59 make up a common-emitter circuit and operate in the switching mode. The indicator lamp 17 is off. At this moment the second transistor switch 15 is non-conducting, as its base is connected via the conducting transistor 58 to the negative bus B of the power source 5.

The capacitor 2 is the second to be charged to reach the operation voltage of the threshold amplifier 25 of the exposure time setting unit 1. As this takes place, the transistor 28 starts to be driven into conduction and operates in a linear mode until the capacitor 2 is charged up to the saturation voltage of the transistor 29. This latter, in turn, renders the transistors 30 and 31 non-conducting. From the collector of the transistor 31 high potential is applied to the base of the transistor 36, renders this transistor conducting and produces a potential difference at the resistor 41, which difference is applied to the base of the transistor 42 and drives it into conduction. As it is driven into conduction, the transistor 42 renders the transistor 43 non-conducting. From the collector of the transistor 43 the high potential is applied to the inputs of the transistors switches 14 and 15.

As it has been mentioned above, the second transistor switch 15 is non-conducting, and the high potential at the output of that switch has no effect upon the operation of the excessive illumination indicating unit 8. The first transistor switch 14 is conducting, and the signal which passes therethrough is applied to the base of the transistor 49 which is driven into conduction and renders the transistor 50 non-conducting. A high potential is produced at the latter's collector, so there is no current across the indicator lamp 16.

From the collector of the transistor 43 the high potential is applied via the resistor 47 to the base of the transistor 44 which becomes conducting and thus renders the transistor 45 non-conducting. The transistors 42, 43, 44 and 45 make up a common-emitter circuit and operate in the switching mode. A high potential is produced at the collector of the transistor 45, so there is no current through the actuator 6.

After the capacitor 10 has been charged to reach a threshold voltage for switching the transistor 48, the latter becomes conducting and connects one lead of the resistor 52 to the negative bus B of the power source 5. The transistor 49 remains conducting, as the high potential is applied to its base via the conducting transistor 14 from the collector of the transistor 43.

As it has been already said, neither of the indicator lamps 16 and 17 is lit, which is indicative of the fact that the illumination of the object being photographed is sufficient for non-automatic photography, so the photographer may further press the release button. As this takes place, the switch 23 is temporarily closed to discharge the latter. The capacitor 2 is discharged, the blades of the shutter open, and the switch 23 is simultaneously disconnected.

Exposure setting then starts.

After the capacitor 2 has been charged to reach the threshold voltage, the switching of the transistors 28 and 29 of the exposure time setting unit 1 and of all the other transistors proceeds in the manner described above. As a result, a high potential is produced at the output III of the exposure time setting unit 1, so there is no more current through the actuator 6, and the shutter is closed.

If the object being photographed is not illuminated well enough, the first to be charged to reach the threshold voltage for switching the transistor 56 is the capacitor 12 (which is also the case with normal illumination of the object being photographed). All the transistors of the excessive illumination indicating unit 8 are switched in the sequence that has been described above. As a result, the second transistor switch 15 is off, and the last transistor 59 of the unit 8 is non-conducting.

The indicator lamp 17 is off.

The second to be charged to reach the threshold voltage for switching the transistor 48 of the insufficient illumination indicating unit 7 is the capacitor 10. The transistor 48 becomes conducting and renders the transistor 49 non-conducting. The transistor 50 is driven into conduction. The transistors 48, 49 and 50 make up a common-emitter circuit and operate in the switching mode.

As a result, there is current through the indicator lamp 16 which is on and indicates that the illumination intensity of the object being photographed is not sufficient for the given exposure.

After the transistor 50 has been driven into conduction, both terminals of the resistor divider 54 and 55 are connected to the negative bus B. A low potential is produced at the base of the first transistor switch 14, so the latter is non-conducting. After the capacitor 2 of the exposure time setting unit 1 has been charged, all its transistors are switched in the sequence that has been described above.

A high potential is produced at the collector of the transistor 43, which potential is applied to the transistor switches 14 and 15. At this moment these switches are non-conducting and have no effect upon the operation of the indicating units 7 and 8. The indicator lamp 16 connected to the output transistor 50 of the insufficient illumination indicating unit 7 continues to be lit.

In case of excessive illumination, the capacitor 2 is charged to reach the threshold voltage for switching the transistors 28 and 29. All the transistors of the exposure time setting unit 1 are switched in the above-mentioned sequence. As a result, a high potential is produced at the collector of the transistor 43 of the exposure time setting unit, which potential is applied to the inputs of the transistor switches 14 and 15. At this moment the transistor switches 14 and 15 are conducting. The first transistor switch 14 is conducting because in the initial position the transistor 48 is non-conducting, the transistor 49 is conducting, and the transistor 50 is non-conducting, so the high potential is applied from the center tap of the resistor divider 54 and 55 to the base of the first transistor switch 14.

The second transistor switch 15 is conducting because of the initial position the transistor 56 is non-conducting, the transistor 57 is conducting, and the transistor 58 is non-conducting, so the high potential from the latter's collector is applied to the base of the transistor 57, the latter is blocked; as a result, the transistor of the switch 15, whereby said switch 15 is kept conducting. After the signal has passed through the conducting transistor switch 15 to the base of the transistor 59 remains conducting. Current flows through the indication 17 which is lit and thus indicates excessive illumination of the object being photographed.

The capacitor 12 is the second to be charged to reach the threshold voltage for switching the transistor 56. The transistor 56 becomes conducting but the transistor 57 remains conducting due to the fact that the blocking signal arrives at its base via the conducting transistor 15.

The third to be charged to reach the threshold voltage for switching the transistor 48 is the capacitor 10, so the transistor 48 is driven into conduction, but the transistor 49 remains conducting, as the high potential is applied to the base of the transistor 49 via the conducting transistor switch 14. The transistor 50 remains non-conducting, so there is no current through the indicator lamp 16. The lamp 16 is off.

A reduction in the supply voltage, for example, due to a discharge of the battery of the power source 5, reduces the current through the resistors 20 and 21. There is a voltage drop at the collector of the transistor 19 and a decrease in the current through the base circuit of the transistor 18. The transistor 18 stops conducting, and the potential at its collector increases, which brings the transistor 19 to a still greater degree of conduction.

Due to the fact that both transistors 18 and 19 operate in a mode close to the structure limit, this change in the collector potentials, brought about by a change in the supply voltage, is dependent upon the selected resistance values of the resistors 20 and 21.

A decrease in the supply voltage brings about a decrease in the rate of changing the capacitor 2 to reach the same operation threshold voltage of the exposure time setting unit 1. But, as it has been noted above, under such conditions the voltage across the collector of the transistor 18 increases and compensates the time difference of charging the capacitor 2. Thus, full compensation of the exposure setting time takes place with a change in the supply voltage.

In the case of the increase in the supply voltage the compensation of the exposure time is effected in a similar manner, but in the reverse order.

A drop or rise in the ambient temperature causes a corresponding drop or rise in the threshold voltage for brining the transistors 28 of the exposure time setting unit 1 into conduction. Consequently, there is a decrease or increase in the voltage difference across the transistors 18, 19 and 22. Due to the use of identical types of transistors, so that there are two base-emitter junctions both in the current amplifier and in the transistors 18, 19 and 22, the temperature compensation with respect to the exposure time is sufficiently accurate.

In respect of the operation of the temperature compensation means, it is submitted that the threshold voltage of the exposure time setting unit 1 is a sum of voltages at two base-emitter junctions of the transitors 28, 29. The change of ambient temperature causes a change of the threshold voltage. For the compensation of this change, and for keeping the exposure time constant, the reference voltage is also composed of the voltage drop at two junctions of the transistors 18, 22 which have the same type of transistors 28, 29.

As to the transistors 37 to 39, 64 and 65, it is submitted that the use of transistors, connected as diodes, with the collectors left unconnected, is well known.

It will be understood that regular diodes could also be used, but the inventive circuit prefers to apply transistors to a unitary type, both for construction and maintenance considerations.

The use of emitter-base junctions of transistors with open collectors in voltage shifting means is predicated by the necessary or advisability to have a maximum voltage level shift. It is well known that the highest voltage of the "on" condition is exhibited by such junctions of transistors having open collectors.

Also it is common to use transistors as diodes in integrated circuits for the purpose of a more stable temperature response because the circuit elements that have identical characteristics exhibit identical responses to the changes of ambient temperature. Different discrete or integrated parts, such as diodes as against transistors, might not behave in such a uniform manner.

The electrical circuitry of the proposed exposure setting device ensures a stable exposure setting time with variations in the supply voltage and temperature within broad limits. The circuitry accurately indicates the limits of a preset time interval.

The device of the present invention is applicable for photographic materials substantially differing from one another in their sensitivity. Due to high input voltage values, the circuitry of the proposed device operates within a broad exposure time range and is constructed with the use of semiconductor elements in a single crystal.

What is claimed is:

1. A photographic exposure setting device for a camera having a shutter, the device comprising: a power source (5) having positive annd negative supply buses (A, B);
   a. a voltage divider (4) for determining the sensitivity range of a photographic material selected for photography, respective leads of said divider being connected to respective ones of said supply buses;
   b. a first integrating timing RC circuit (1a) having a center tap, leads of said circuit being connected to respective ones of said supply bases, the illumination of a photoresistor (3) in said circuit (b) determining a time constant of said circuit (b), which constant is an optimum exposure time for a given illumination intensity of the object being photographed, from which the reflected light is incident upon said photoresistor;
   c. an exposure time setting unit (1) for a camera having a shutter, said exposure time setting unit having two inputs (I, II) and two outputs (III, IV), one (I) of said inputs being connected to said center tap of the circuit (b), the other (II) of said inputs of the unit (c) being connected to the center tap of said divider (a) for setting an operation threshold of said unit (c), depending upon the sensitivity range of the selected material;
   d. a voltage stabilizer (13), having inputs connected to respective ones of said supply buses;
   e. a second integrating timing RC circuit (10a), one of its leads being connected to one output of said stabilizer (d) in order to stabilize its time constant, another lead of said circuit (e) being connected to said negative supply bus;
   f. a first transistor switch (14) having two inputs, one thereof being connected to one (IV) of said outputs of the unit (c);
   g. an insufficient illumination indicating unit (7) having two inputs (I, II) and two outpus (III, IV), there being connected to one (I) of said inputs of the unit (g) the center tap of said circuit (e), whereas an output of said switch (f) is connected to the other (II) of said inputs of the unit (g); one (IV) of said outputs of the unit (g) being connected to the other of said inputs of the switch (f), another one (III) of said ouputs of the unit (g) being connected to said positive supply bus via an indicator lamp (16) for warning about unfavorable conditions for photography;
   h. a second transistor switch (15), also having two inputs, one thereof being connected to said one (IV) output of the unit (c);
   i. a third integrating timing RC circuit (11a), one of its leads being connected to an output of said stabilizer (d) to stabilize its constant, another lead of said circuit (i) being connected to said negative supply bus;
   j. an excessive illumination indicating unit (8) having two inputs (I, II) and two outputs (III, IV), the center tap of said circuit (i) being connected to (I) of said inputs, whereas an output of said switch (h) is connected to another one (II) of said inputs of the unit (j); one (IV) of said outputs of the latter being connected to the other of said inputs of the switch (h), another of said outputs of the limit (j) being connected to said positive supply bus via indicator lamp (17) for warning about unfavorable conditions for photography; and
   k. an actuator (6) connected to the shutter of the camera for closing and opening said shutter, one lead of said actuator being connected to the other output (III) of said unit (c), its other lead being connected to said positive supply bus.

2. The photographic exposure setting device as defined in claim 1, further comprising (1) an exposure time stabilizer having two outputs, one of the latter being connected to said one input (I) of the unit (c) via a capacitor (2) of said circuit (b), its other output being connected to said positive supply bus via a resistor (20), said exposure time stabilizer (1) having a flip-flop including transistors (18, 19) whose outputs are at their collectors, and a transistor (22) interposed between the emitters of said transistors of the flip-flop and said negative supply bus, and operating as diodes to effect a shift in the input voltage across said one (I) input of the unit (c).

3. A photographic exposure setting device for a camera having a shutter, the device comprising: a power source (5) having a positive and negative supply buses (A, B);
   a. an exposure time setting unit (1) for a camera having a shutter, said exposure time setting unit having two inputs (I, II) and two outputs (III, IV); said unit (a) including a threshold amplifier (25) whose two inputs are connected to said inputs (I, II) of the unit (a); said amplifier including serially connected transistors (28 to 31) constituting a common-emitter circuit, the first transistor (28) operating in the linear mode, whereas the remaining transistors (29 to 31) operate in the switching mode; one input of said amplifier constitute one (I) of said inputs of the unit (a), being the base of said first transistor; another input of said amplifier, which forms another one (II) of said inputs of the unit (a), being linked to the interconnected emitters of two (29, 31) of said transitors, the output of said amplifier being linked to the collector of the last one (31) of said transistors;
   b. means (26) for shifting the output voltage level of said amplifier (25), said means constituting a cascade of transistors (36 to 39) serially interconnected by way of their base - emitter junctions, the base of the first one (36) of said last-named transistors being connected to said output of the amplifier (25);
   c. a current amplifier (27) whose input is connected to the emitter of the last one (39) of said transistors of the means (b), said current amplifier including serially interconnected transistors (42 to 45) constituting a common-emitter circuit and operating in the switching mode, one output of said current amplifier (27) being the collector of the last one (45) of its transistors, another output thereof being the collector of one (43) of said transitors, both said last-named outputs constituting said outputs (III, IV) of the unit (a);

d. three integrating timing RC circuits (1a, 10a, 11a), leads of a first one (1a) of said circuits being connected to respective ones of said supply buses, whereas a center tap of said first circuit (1a in d) is connected to said one (I) input of the unit (a);

e. a voltage divider (4) whose leads are connected to respective ones of said supply buses, a center tap of said divider (e) being connected to said input (II) of the unit (a);

f. a voltage stabilizer (13) also connected to said positive supply bus via a ballast current-limiting resistor (66), said stabilizer (f) including at least two transistors (64, 65) that are serially interconnected via their base - emitter junctions;

g. a first transistor switch (14) having two inputs and one output, one of said inputs being connected to one (IV) of said outputs of the unit (a); said second circuit (10a in d) being connected to the output of said stabilizer (f) and to said negative supply bus;

h. an insufficient illumination indicating unit (7) having two inputs (I, II) and two outputs (III, IV), there being connected to one (I) of said inputs of the unit (b) the center tap of said second circuit (10a in d), whereas an output of said switch (g) is connected to the other (II) of said inputs of the unit (h); the latter including a threshold current amplifier including serially interconnected transistors (48 to 50) constituting a common-emitter circuit and operating in the switching mode; one input of said threshold current amplifier, which forms said one input (I) of the unit (h), being the base of the first one (48) of said transistors, the other input of said threshold current amplifier, which forms said other input (II) of the unit (h), being the base of one (49) of said transistors, one output of said threshold current amplifier, and of said unit (h), being common with the collector of the last one (50) of said transistors in the current amplifier, another output of the latter being the collector of said last transistor (50), said last-names other output being connected to said other input of the switch (g);

i. a second transistor switch (15), having two inputs and one output, one of said inputs being connected to said one output (IV) of the unit (a); said third circuit (11a in d) having its leads connected to said output of the stabilizer (f) and said negative supply bus;

j. an excessive illumination indicating unit (8) having two inputs (I, II) and two outputs (III, IV), there being connected to one (I) of said inputs the center tap of said third circuit (11a in d), another one (II) of said inputs being connected to said output of the switch (i), said unit (j) including a threshold current amplifier including serially interconnected transistors (56 to 59) that constitute a common-emitter circuit and operate in the switching mode, one input of said last-named threshold current amplifier, which forms said one input (I) of the unit (j), being the base of one (57) of said transistors, one output of the same amplifier, and of the unit (j), being the collector of the last one (59) of said transistors in the threshold current amplifier, said other output being the collector of another one (58) of said transistors, said other output being connected to said other input of the switch (i);

k. an actuator (6) connected between said positive supply bus and said one output (III) of the unit (a); and l. two indicator lamps (16, 17), each having one of its terminals connected to said positive supply bus, the other terminals being respectively connected to said one outputs of the units (h and j).

* * * * *